United States Patent
Catching et al.

(10) Patent No.: US 7,512,303 B2
(45) Date of Patent: Mar. 31, 2009

(54) WAFER SCALE METHOD OF MANUFACTURING OPTICAL WAVEGUIDE DEVICES AND THE WAVEGUIDE DEVICES MADE THEREBY

(75) Inventors: Benjamin F. Catching, Santa Rosa, CA (US); Donald M. Friedrich, Windsor, CA (US); Charles A. Hulse, Sebastopol, CA (US); Marc K. Von Gunten, Los Altos, CA (US); Jason Reed, West Hartford, CT (US); Karl Kissa, West Simsbury, CT (US); Glen Drake, Windsor, CT (US); Julia Duncan, North Granby, CT (US); William J. Minford, Windsor, CT (US); Hiren V. Shah, Santa Rosa, CA (US); Jerry Zieba, Santa Rosa, CA (US); Jason Jiazhan Xu, Weatogue, CT (US)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 11/769,070

(22) Filed: Jun. 27, 2007

(65) Prior Publication Data
US 2008/0085089 A1    Apr. 10, 2008

Related U.S. Application Data

(60) Provisional application No. 60/806,040, filed on Jun. 28, 2006.

(51) Int. Cl.
*G02B 6/10*    (2006.01)
(52) U.S. Cl. .................................................... 385/131
(58) Field of Classification Search ................. 385/131
See application file for complete search history.

(56) References Cited

U.S. PATENT DOCUMENTS 4,390,245 A    6/1983    Shimizu et al. ............. 349/153

(Continued)

FOREIGN PATENT DOCUMENTS

DE    19853669    5/1999

(Continued)

OTHER PUBLICATIONS

M. Fujimuri et al., "Periodically-Poled LiNbO₃ Waveguide Devices for Short-Wavelength Light Generation", Lasers and Electro-Optics Society Annual Meeting, LEOS '97 10th Annual Meeting, Conference Proceedings, California, Nov. 10-13, 1997, IEEE, vol. 1, pp. 108-109.

(Continued)

*Primary Examiner*—Jerry T Rahll
(74) *Attorney, Agent, or Firm*—Allen, Dyer, Doppelt, Milbrath & Gilchrist, P.A.

(57) ABSTRACT

The invention relates to a wafer scale process for the manufacture of optical waveguide devices, and particularly for the manufacture of ridge waveguide devices, and the improved waveguides made thereby. The present invention has found a process for achieving sub-micron control of an optical waveguiding layer thickness by providing a dimensionally stable wafer assembly into which adhesive can be introduced without altering the planar relationship between a carrier wafer and an optically transmissive wafer in wafer scale manufacture. This process permits wafer scale manufacture of optical waveguide devices including thin optically transmissive layers. A pattern of spacer pedestals is created by a deposition and etch back, or by a surface etch process to precisely reference surface information from a master surface to a carrier wafer to a thin optically transmissive wafer. The tolerance achievable in accordance with this process provides consistent yield across the wafer.

31 Claims, 19 Drawing Sheets

U.S. PATENT DOCUMENTS

| | | | |
|---|---|---|---|
| 5,433,911 A | 7/1995 | Ozimek et al. | 264/261 |
| 6,631,231 B2 | 10/2003 | Mizuuchi et al. | 385/122 |
| 6,896,949 B1 | 5/2005 | Scobey et al. | 428/173 |
| 2003/0223722 A1 | 12/2003 | Sugita et al. | 385/129 |
| 2007/0189689 A1 | 8/2007 | Yamaguchi et al. | 385/129 |

FOREIGN PATENT DOCUMENTS

| | | |
|---|---|---|
| EP | 1584975 | 10/2005 |
| JP | 2004145261 | 5/2004 |
| WO | 00/73090 | 12/2000 |
| WO | 02/11341 | 2/2002 |
| WO | 03/058337 | 7/2003 |
| WO | 2006/041172 | 4/2006 |

OTHER PUBLICATIONS

"Investigation of Thermoluminescence and the Pyroelectric Effect" by Evans et al. Proceedings of the March Meeting of the American Physical Society, Indianapolis, IN, USA, Mar. 18, 2002.

"Elimination of Photorefractive Grating Writing Instabilities in Iron-Doped Lithium Niobate" by Evans et al. IEEE Journal of Quantum Electronics, vol. 38, No. 12, Dec. 2002 pp. 1661-1665.

"Six-wavelength PPLN OPO" by Mathews et al. OSA Trends in Optics and Photonics on Advanced Solid State Lasers, vol. 10, Jan. 27, 1997. pp. 244-246.

"Spatial addressing of picosecond signals at 1549nm in engineered nonlinear waveguides" by Baronio et al. Transparent Optical Networks, 2004. Proceedings of 2004 6th International Conference on Warsaw vol. 1, Jul. 4, 2004. pp. 146-149.

"Simultaneous label swapping and wavelength conversion of multiple independent WDM channels in an all-optical MPLS network using PPLN waveguides as wavelength converters" by Fejer et al. Journal of Lightwave Technology, vol. 21, No. 11, Nov. 2003, pp. 2739-2745.

Elimination of photorefractive grating writing instabilities during contradirectional two-wave mixing in iron-doped lithium niobate: by Evans et al. Conference on Lasers and Electro-Optics. Technical Digest. Post Conference Edition. vol. 73, May 19, 2002. pp. 272-273.

WAFER SCALE METHOD OF MANUFACTURING OPTICAL WAVEGUIDE DEVICES AND THE WAVEGUIDE DEVICES MADE THEREBY

CROSS-REFERENCE TO RELATED APPLICATIONS

The present invention claims priority from Provisional Patent Application No. 60/806,040 filed Jun. 28, 2006, by Catching et al. entitled "Ridge Waveguide with Pedestals —A Component For Solid State Blue Lasers" which is incorporated herein by reference.

TECHNICAL FIELD

The present invention relates to a wafer scale process for the manufacture of optical waveguide devices, and particularly for the manufacture of ridge waveguide devices, and the improved ridge waveguides made thereby.

BACKGROUND OF THE INVENTION

Optical waveguide devices require a high degree of accuracy in the dimensions of the optical waveguiding layer. In the past it has not been possible to achieve the degree of parallelism and uniformity in a wafer scale manufacturing process that would enable an adequate yield across the wafer, and from wafer to wafer. A wafer of optically transmissive material thinned and polished to waveguide dimensions of approximately 1-10 microns does not have the dimensional stability to be polished to or to hold the flatness required, or even to be handled without breaking. In order to achieve the degree of parallelism required in a thin optical material, a master reference plane must be provided in a carrier substrate wafer. It is known in the art to polish wafers to a uniformity of parallelism within 0.005 microns. However, for wafer scale manufacture, this precision is not transferred to the thin waveguiding layer due to variation introduced by the adhesive layer securing the waveguiding layer to the carrier substrate. Optical devices such as planar lightwave circuits, electro-optic modulators and ridge waveguide devices are examples of optical waveguide devices for which dimensional uniformity is essential to achieve wafer scale production.

Second harmonic generation applications (frequency doubling) using ridge waveguide devices have been developed to create laser output in the ultraviolet, visible and infrared wavelength spectrum for use in numerous technologies. Demand for these devices is high. However, the manufacture of ridge waveguide devices has been limited to individual device processing. One problem that arises in the manufacture of ridge waveguides for the application of second harmonic generation is the control of dimensions of the ridge. In particular the thicknesses of the ridge waveguide must be controlled accurately, due to sensitivity of the upconversion wavelength to all dimensions of the ridge. Lateral dimensions are controlled with photolithographic processes, while vertical dimensions are controlled by etching and polishing processes.

Ridge waveguide devices for second harmonic generation considered in this application have periodically poled regions in the waveguides for phase matching the pump and output signals. Adhesive assembly of the supporting carrier wafer and optically transmissive wafer is preferred. In order to achieve adequate manufacturing yield, the range of thickness of the ridge and planar slab region must be controlled to within a few tenths of a micron. In order to achieve this level of uniformity across the wafer and from wafer-to-wafer, the thickness of the adhesive between the transmissive wafer and carrier wafer must be controlled to within this same range. This level of control for wafer scale manufacture has not been demonstrated in the prior art.

An optical wavelength conversion element is disclosed in U.S. Pat. No. 6,631,231 by Kiminori Mizuuchi et al. issued to Matsushita Electric Industrial Co. Ltd. on Oct. 7, 2003. In this patent a continuous joining layer of amorphous material is used to join a poled waveguide structure to a substrate layer. No method for controlling the adhesive thickness is disclosed, although the disclosure does recognize some critical optical limitations to adhesive thickness. Instead, significant post assembly finishing is disclosed. These are labor intensive methods for individual device production. Such methods do not produce high yield. Furthermore, the Mizuuchi design is dependent on the optical properties of the adhesive layer, which limits the design choice.

Adhesive layer spacing is known in various optical industries. For instance glass fiber particles are disclosed for use as spacers between LCD display screen layers in U.S. Pat. No. 4,390,245. U.S. Pat. No. 6,896,949 disclosing the wafer scale manufacture of etalons also makes use of small beads to facilitate spacing between plural assembled etalons, or of fritted glass which is applied to a certain thickness and heated to its melting point to join etalon elements. An image sensor as disclosed in U.S. Pat. No. 5,433,911 also discloses the assembly of an individual device, using spacers constructed through resist patterning in order to secure a protective cover with controlled parallelism. However, none of these disclosures provide instruction for adhesive assembly suitable for the present application that can provide the level of accuracy necessary for wafer scale production control across the wafer and from wafer to wafer. Beads and spacers available in the industry do not provide the uniformity within 0.1 microns deviation needed to ensure tolerance control across the wafer.

A wafer scale manufacturing process for optical waveguide devices, and ridge waveguide devices in particular, remains highly desired in the industry.

An object of the present invention is to provide a wafer scale manufacturing process for producing optical waveguide devices with sub micron accuracy and high yield.

It is a further objective of the present invention to provide a ridge waveguide device made in accordance with the manufacturing process of the present invention including rigid spacing elements within a precisely dimensioned discontinuous adhesive layer.

SUMMARY OF THE INVENTION

The present invention has found a process for achieving sub-micron control of an optical waveguiding layer thickness by providing a dimensionally stable wafer assembly into which adhesive can be introduced without altering the planar relationship between a carrier wafer and an optically transmissive wafer in wafer scale manufacture. This process permits the required dimensional control of ridge and slab in ridge waveguide devices in wafer scale manufacture. More generally, this process permits wafer scale manufacture of optical waveguide devices including thin optically transmissive layers. In particular, a pattern of spacer pedestals is created by a deposition and etch back, or by a surface etch process to precisely reference the joining surface of the optically transmissive wafer to the joining surface of the carrier wafer which is by necessity parallel to the exposed surface of the carrier wafer which is in turn referenced to a reusable master surface. The tolerance achievable in accordance with this process provides consistent yield across the wafer. The process additionally provides enhanced structural integrity to the finished devices.

Accordingly, the present invention relates to a wafer scale process for manufacturing optical waveguide devices comprising the steps of:

provding a transmissive wafer of optically transmissive material having a joining surface and an exterior surface;

providing a carrier wafer having a joining surface and an exterior surface substantially parallel to the joining surface;

creating a relief pattern on one of the joining surfaces, the relief pattern comprising pedestals having a substantially uniform height;

contacting the pedestals with the joining surface of the other wafer and introducing adhesive material into the spaces created by the relief pattern;

polishing and thinning the transmissive wafer to a prescribed dimension;

creating a waveguide structure in the transmissive wafer;

dicing the assembled wafer structure into individual waveguide devices.

The present invention further relates to a wafer scale process wherein the waveguide structure is selected from the group consisting of: ridge waveguide, indiffused waveguide, and planar waveguide.

Another aspect of the present invention relates to a method of manufacturing optical ridge waveguide devices comprising the steps of:

providing a transmissive wafer of optically non-linear transmissive material having a joining surface and an exterior surface;

providing a carrier wafer having a joining surface and an exterior surface;

applying a cladding layer to the joining surface of the optically transmissive wafer including the waveguide structure;

etching a portion of the cladding layer to the joining surface, without removing the cladding on the waveguide structure, to create a relief pattern adapted to facilitate an adhesive joint between the joining surfaces;

contacting the cladding layer to the joining surface of the carrier wafer, and introducing adhesive into the spaces created by the relief pattern;

polishing and thinning the exterior surface of the transmissive wafer;

creating a waveguide structure in the joining surface of the optically transmissive wafer; dicing the assembled wafer structure into individual waveguide devices.

Another feature of the present invention provides an optical waveguide device comprising:

a carrier substrate having a joining surface substantially parallel to an exterior surface;

an optically transmissive substrate adhesively joined to the carrier substrate having a waveguide formed therein;

a plurality of rigid pedestals abutting a joining surface of the carrier substrate and a joining surface of the transmissive substrate; and a discontinuous adhesive layer surrounding the pedestals and securing the joining surface of the carrier substrate to the joining surface of the transmissive substrate, having a uniform thickness defined by a height of the pedestals.

BRIEF DESCRIPTION OF THE DRAWINGS

The invention will be described in greater detail with reference to the accompanying drawings which represent preferred embodiments thereof, wherein.

DETAILED DESCRIPTION

Second harmonic generation is a commonly practiced technique for obtaining coherent light at short wavelengths from long wavelength laser sources. It is a non-linear process where an optical beam, called the pump beam, interacts with an optically non-linear medium, in the case of second harmonic generation, to generate a second harmonic beam, where the frequency of the second harmonic beam is twice the frequency of the pump beam. Equivalently, the free space wavelength of the second harmonic is half the free space wavelength of the pump. Any material which lacks inversion symmetry can be used as the optically non-linear medium for second harmonic generation. Materials which are commonly used include lithium niobate, MgO-doped lithium niobate and KTP ($KTiOPO_4$). Second-harmonic generation is one of a class of methods, known collectively as non-linear frequency mixing, which employ similar ridge waveguide optical structures to generate or amplify coherent light at a desired wavelength from light at an input, or from a pump.

Figure 1:
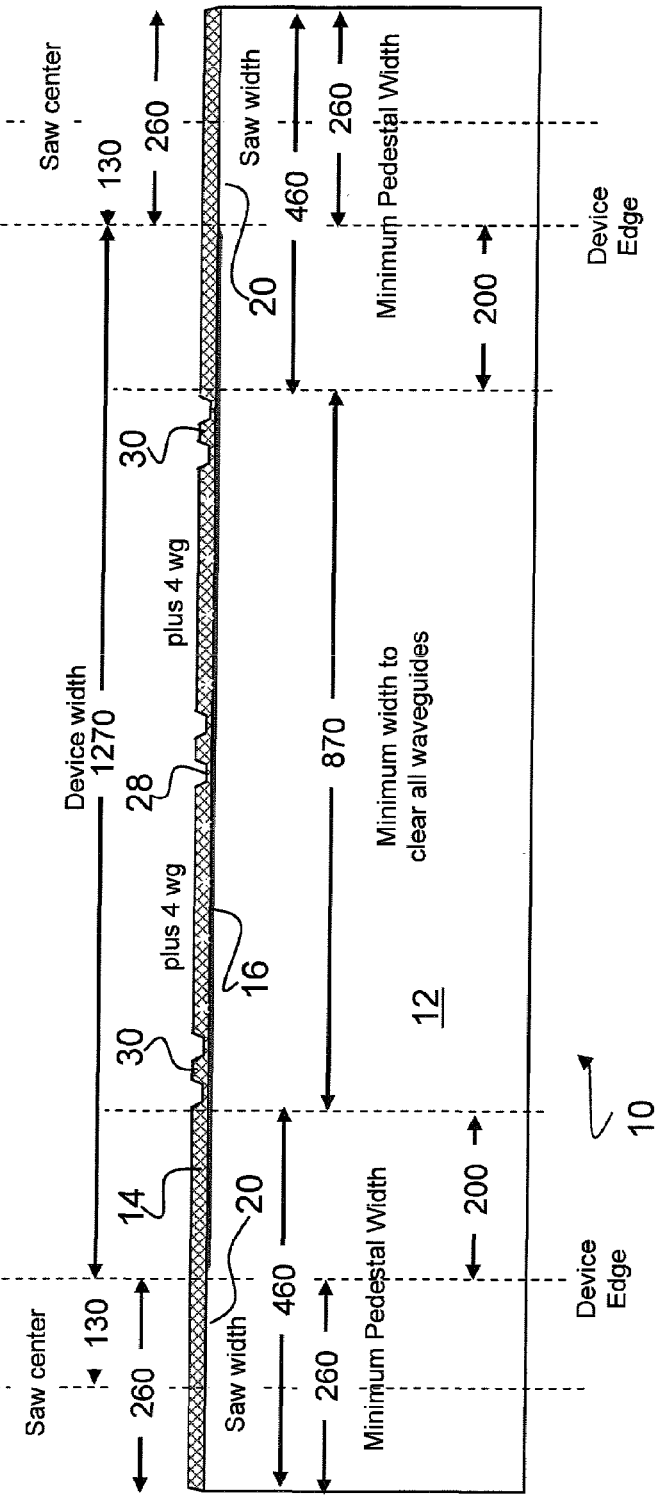
FIG. 1 is a cross-section of a ridge waveguide device in accordance with the present invention in which pedestals are located on the carrier wafer along dicing streets, prior to dicing from the assembled wafer structure.

FIG. 1 is a cross section illustrating a completed ridge waveguide assembly 10 (prior to dicing from the wafer) manufactured in accordance with the present invention. In this embodiment multiple ridge waveguides 30, in this case 11, are formed on a single chip. Each waveguide 30 has a slightly different conversion wavelength, which increases the probability that a ridge waveguide 30 with the correct conversion wavelength lies within the device. The waveguides are designed to operate at a specified laser input and output wavelength. The acceptance bandwidth of the waveguide is narrow, and small deviations of the waveguide dimensions can shift the operating center wavelength (CWL) too far from the specified laser input wavelength. Dimensional variation due to processing can be compensated by forming several adjacent waveguides on one device. Each ridge waveguide 30 within the device 10 may have slightly different lateral dimensions, or include a periodically-poled region of slightly different period. The conversion wavelength of each ridge waveguide 30 is measured, and the suitable waveguides are identified. Hence, the use of multiple, slightly different, ridge waveguides 30 improves the manufacturing yield.

As shown in FIG. 1, the ridge waveguide device 10 comprises a carrier wafer 12 and a transmissive layer 14 of optically non-linear material each having a joining surface secured by an adhesive layer 16. The transmissive layer 14, as mentioned above is an optically non-linear material such as lithium niobate, MgO doped lithium niobate, or KTP. The carrier wafer 12 is preferably a material having a coefficient of thermal expansion (CTE) very close to that of the transmissive layer 14, in all directions. The carrier wafer 12 is polished to a surface parallelism within 0.005 microns. A preferred assembly includes a lithium niobate carrier wafer 12 and MgO doped lithium niobate transmissive layer 14. The carrier wafer 12 is etched with wide trenches 18 (see FIG. 3) leaving pedestals 20 along the dicing streets. The tops of the pedestals 20 retain the reference plane of the polished carrier wafer 12. Pedestals 20 can be narrow such that they will be removed by the dicing saw; alternatively, they can be wide enough that pedestals remain in the diced devices. The trench depth is approximately 1 micron. Thus the pedestal height of 1 micron controls the adhesive layer 16 in the trench 18 to this thickness, while the transmissive wafer 14 is supported by the tops of the pedestals 20 on the reference plane of the carrier wafer 12. Alternatively, as can be seen more clearly in the enlarged section of the embodiment 11 illustrated in FIG. 2, the adhesive layer 16 is interrupted by a plurality of pedestals 20 within the device, which are not removed by dicing. The pedestals 20 are constructed of a hard, dense material which forms a solid relief structure in direct contact with the wafers 12,14. Adhesive is introduced into the interstices between the wafers 12,14 and surrounding the pedestals 20. Pedestals 20 can be formed by etching trenches 18 from the surface of the carrier wafer 12 through a photomask. Alternatively, pedestals 20 can be formed by depositing a highly uniform, thin layer onto the joining surface 13 of the carrier wafer 12, or the joining surface 15 of the transmissive wafer 14. This deposited layer is etched back to create a relief pattern of pedestals 20 into which adhesive can be introduced, by wicking or pressing for example. The deposited layer is applied through a shadow mask or a photolithography mask to create a relief pattern of pedestals 20. Alternatively the pedestals 20 can be formed by deposition over a patterned photo resist and subsequent lift-off.

Preferably the pedestals 20 are formed of a deposited layer which is of a material selected to be differentially etchable to the carrier wafer. For example, an $SiO_2$ or $Ta_2O_5$ layer is easily chemically etched and lithium niobate acts as an etch stop. In addition, it is advantageous if the deposited layer is selected from a material optically similar to the adhesive, as this simplifies the thickness metrology. Most oxide dielectrics are suitable, as are durable metals such as Cr, Ni and Ti/W. A precise uniform layer can be applied by physical vapor deposition (PVD) including sputtering, electron beam, ion assisted, or atomic layer deposition, for example. Chemical vapor deposition (CVD) techniques are also sufficient, such as plasma enhanced CVD. For manufacturing tolerances, deposited pedestals 20 must have a height uniformity of 0.05 microns and preferably within 0.01 microns.

Figure 2:
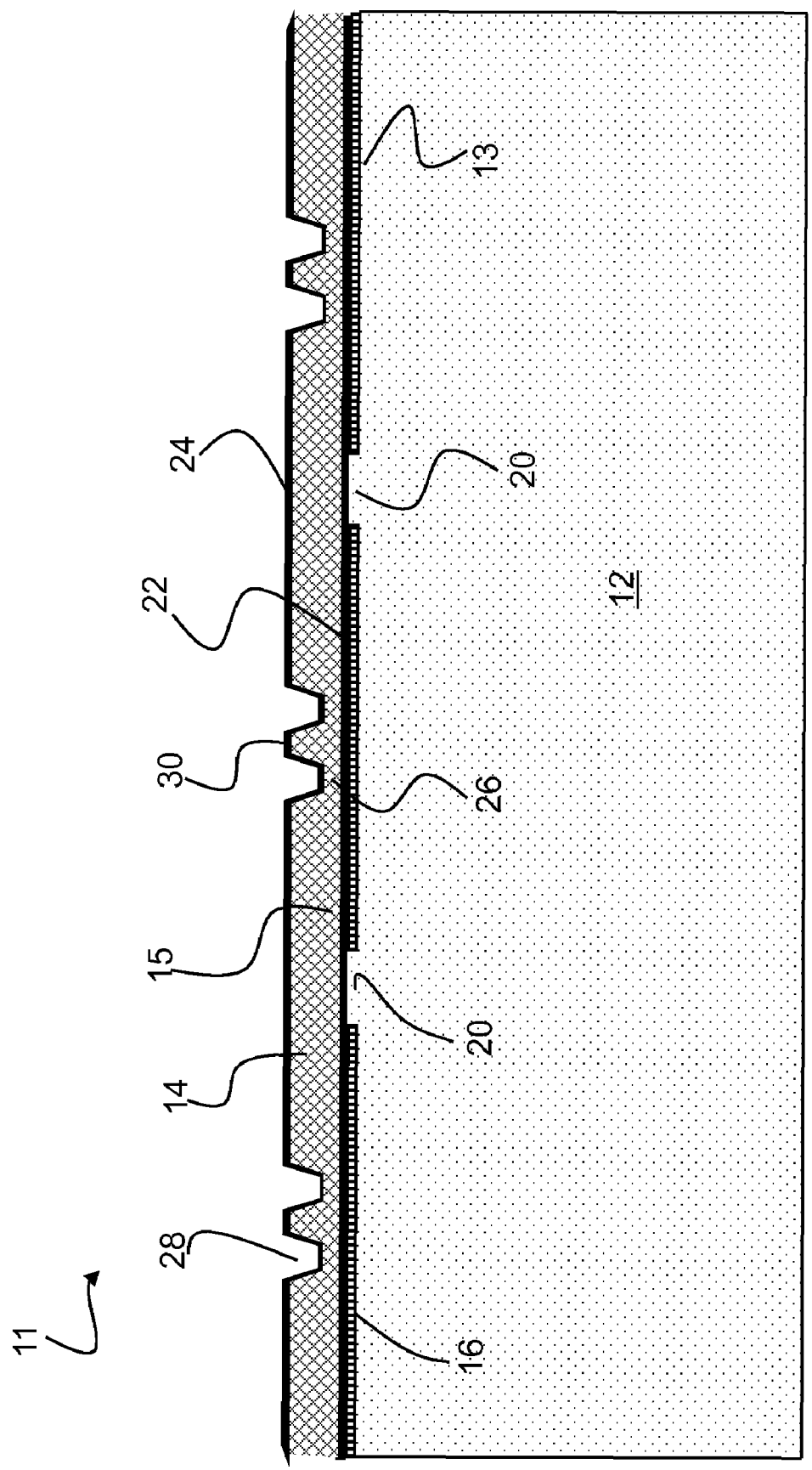
FIG. 2 is an enlarged cross-section of a portion of a further embodiment of the present invention in which pedestals are distributed across the waveguide device.

The relief pattern preferably creates continuous channels open at either end to facilitate adhesive wicking. Alternatively adhesive may be introduced on one or both joining surfaces 13,15 prior to assembly, subsequently pressure is applied to bring the joining surfaces into contact with the pedestals 20. FIG. 2 illustrates a narrow pedestal 20 between each ridge waveguide 30 on the device 11, while FIG. 1 shows wide pedestals 20 only at the periphery of the device 10, where a dicing saw will cut the assembly into individual devices. The wide pedestals can be designed to be completely removed by the dicing saw, or to remain in the finished device. Furthermore, a device can contain either narrow or wide pedestals or both. One benefit of leaving the pedestals in the periphery of the final device is to reduce the outgassing rate of the adhesive. This is of particular interest for device lifetime reasons in hermetic packages. Pedestals also contribute to a more dimensionally stable structure that resists slumping which might disrupt waveguide alignment over time.

The optical properties of the joining layer do not affect the optical function of the waveguide device. The adhesive may be amorphous or crystalline, may be transparent, scattering or opaque and may have any refractive index and absorption coefficient. A preferred adhesive is low viscosity, particle-free, cures without evolving gasses, has low shrinkage, low stress, is capable of withstanding subsequent processing steps and is permanent. An example of a preferred adhesive includes UV15LV, from MasterBond The wafer scale process according to the present invention can produce approximately 200 devices depending on the waveguide design, over a 3 inch wafer, in the same production time and energy consumption as current processes expend on a single device. Furthermore, the devices manufactured according to the wafer scale process of the present invention have a number of advantages over the prior art as discussed above.

Figure 3:
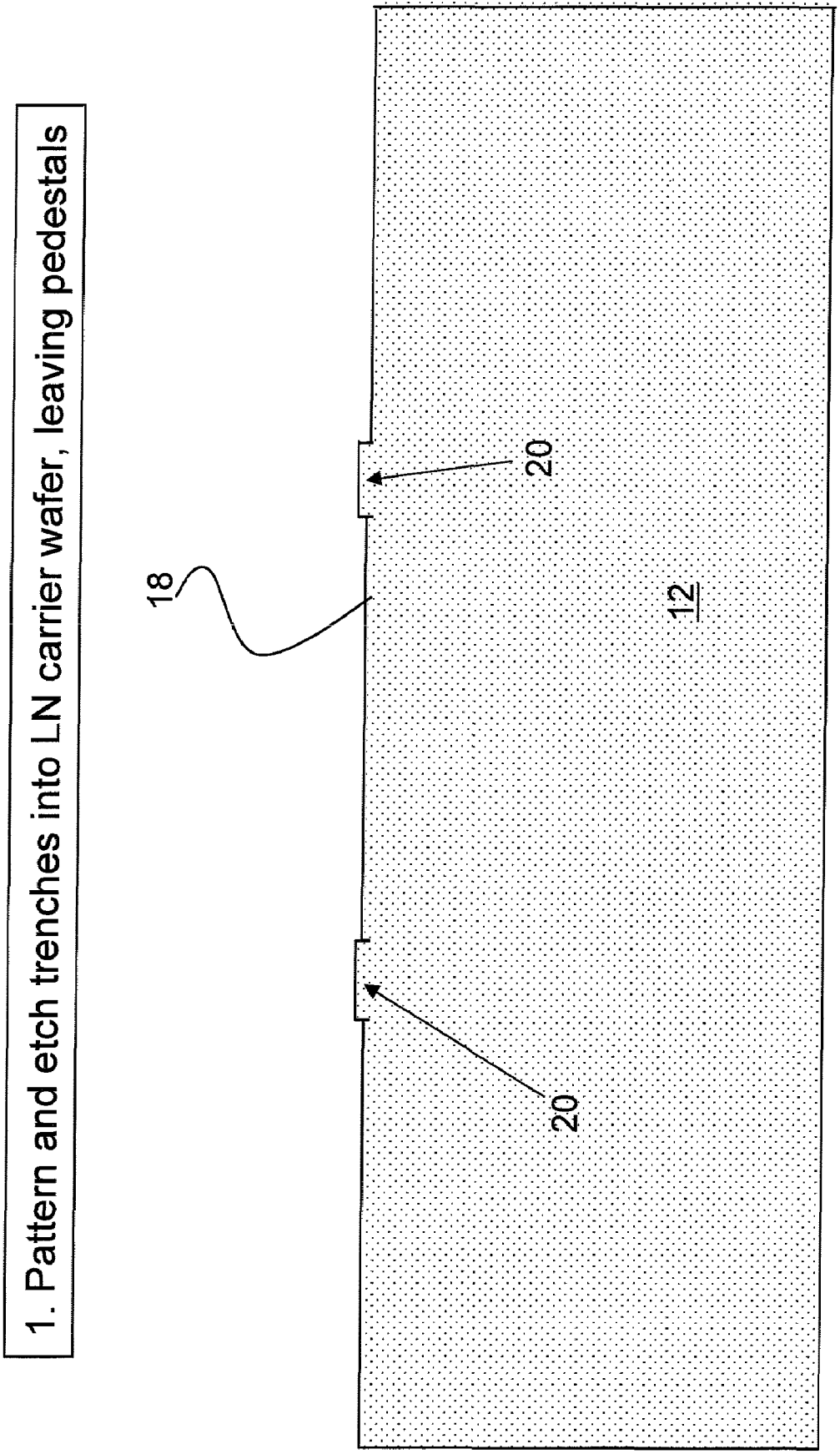
FIG. 3 illustrates a first step in a method in accordance with the present invention in which trenches are etched in a carrier wafer to form pedestals.

FIGS. 3-8 illustrate a first method in accordance with the present invention. In accordance with the first method as shown in FIG. 3, a lithium niobate carrier wafer 12 is polished to have a surface parallelism within 0.005 microns, and preferably within 0.001 microns. The carrier wafer 12 is patterned and etched to form broad shallow trenches 18 in the joining surface 13 leaving pedestals 20 between them. The trenches 18 are between 0.5 microns and 5 microns deep, preferably 1.0 microns deep. The carrier wafer 12 is preferably congruent lithium niobate of the same crystal orientation as the MgO-doped lithium niobate waveguide layer, a material of lower cost than the waveguide layer, and readily available in all size wafers. The pedestals 20 can be located between each ridge waveguide 30 or located only at the perimeter of each device 10, as shown in FIG. 1. Adding pedestals 20 between ridge waveguides 30 improves the control of the waveguide layer reference to the carrier wafer surface. However, increasing the number of pedestals 20 does reduce the surface area of adhesive, reducing the strength of the adhesive bond. Thus, the relief pattern of pedestals must balance these factors. The level of accuracy of the present invention is controlled across wafers of up to 3 inch diameter, and can be applied to larger wafers.

Figure 4:
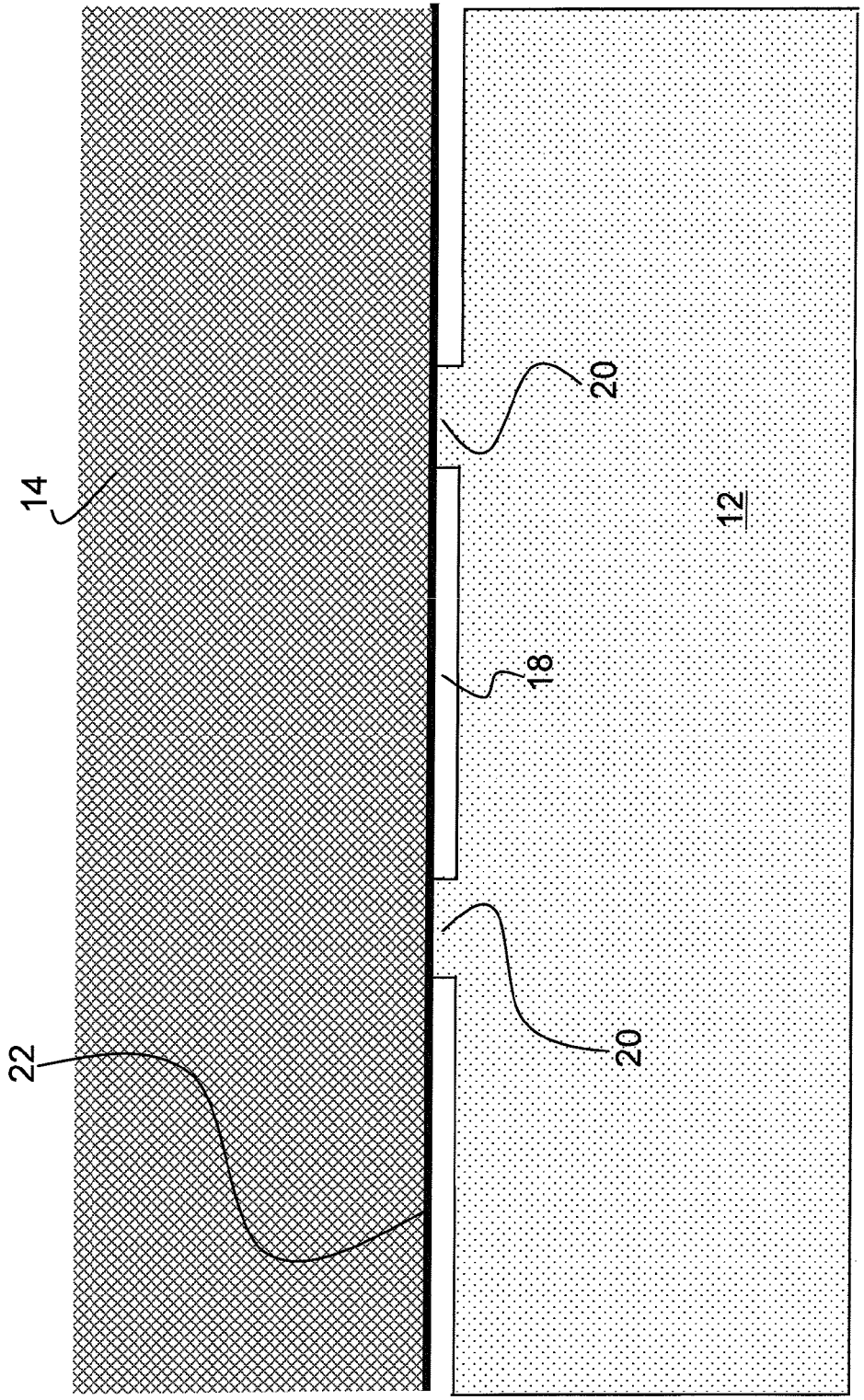
FIG. 4 illustrates a further step to the method from FIG. 3, in which an $SiO_2$ cladding is applied to a MgO doped LN transmissive wafer prior to joining the two wafers.
Figure 5:
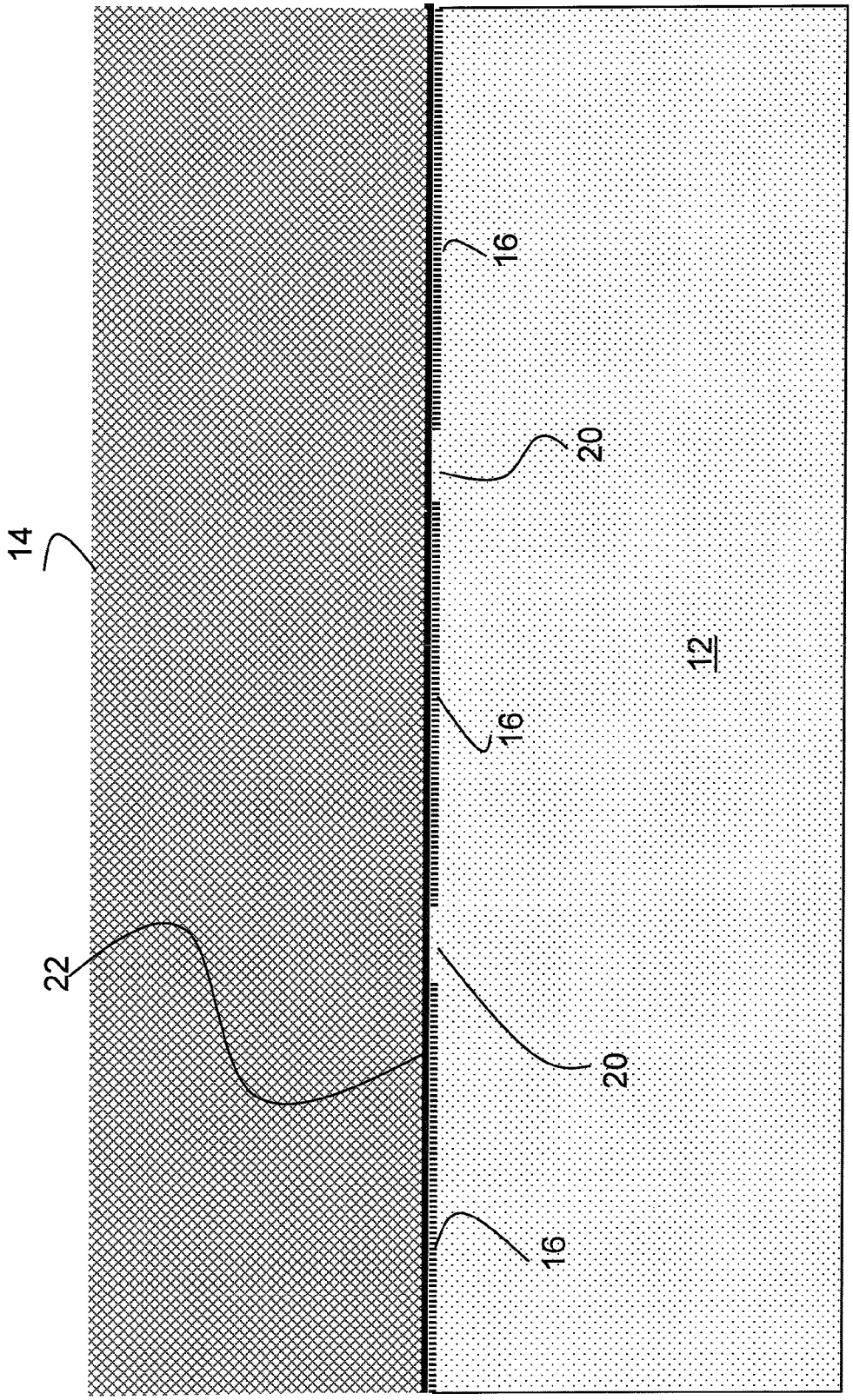
FIG. 5 illustrates a further step to the method from FIG. 4, in which adhesive is introduced to the space between the wafers by wicking.

In FIG. 4, a thick Mg-doped lithium niobate wafer 14, surface coated with an appropriate cladding material 22, such as $SiO_2$ on the joining surface 15, is contacted to the joining surface 13 of the carrier wafer 12. The surfaces need to be clean and particle-free. External uniform pressure is preferably applied The bottom $SiO_2$ coating 22 can be eliminated if the pedestals 20 are not underneath a ridge waveguide 30, though the $SiO_2$ coating may improve adhesion of the assembly. In FIG. 5, adhesive 16 is wicked into the gap created by the pedestals 20. The use of a cladding layer 22 eliminates any optical property specification for the adhesive material.

Figure 6:
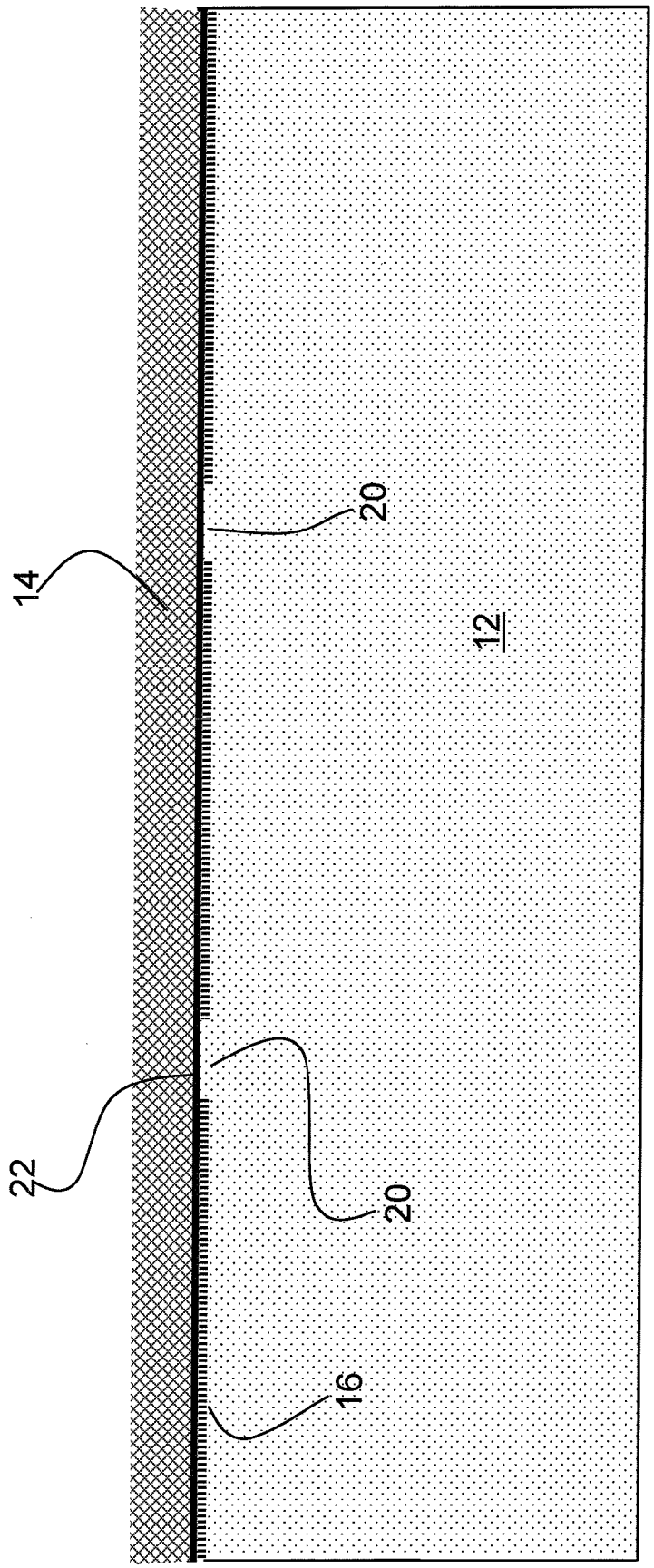
FIG. 6 illustrates a further step to the method from FIG. 5, in which the MgO doped LN transmissive wafer is thinned.
Figure 7:
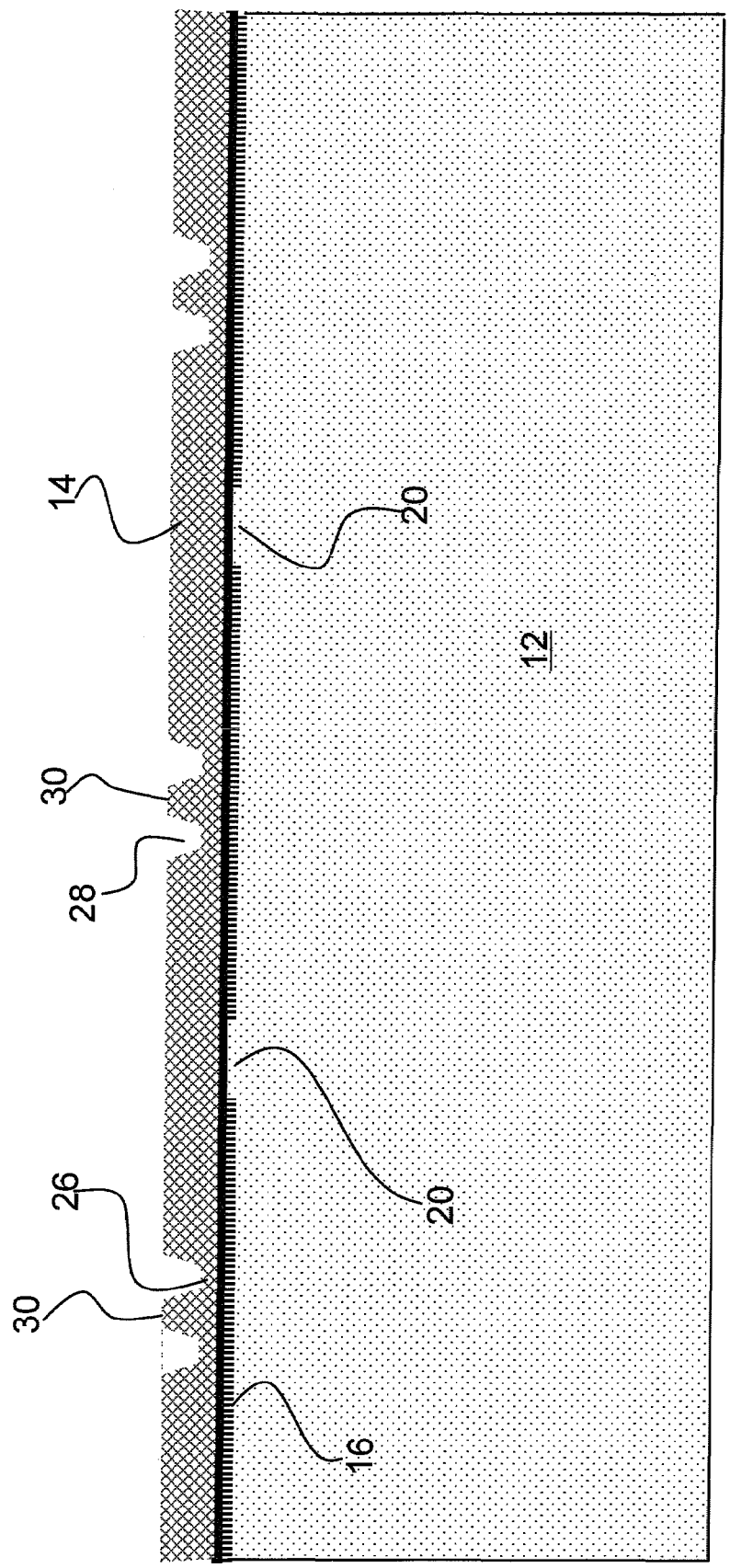
FIG. 7 illustrates a further step to the method from FIG. 6, in which trenches are etched into the thinned MgO doped LN wafer to form ridge waveguides.
Figure 8:
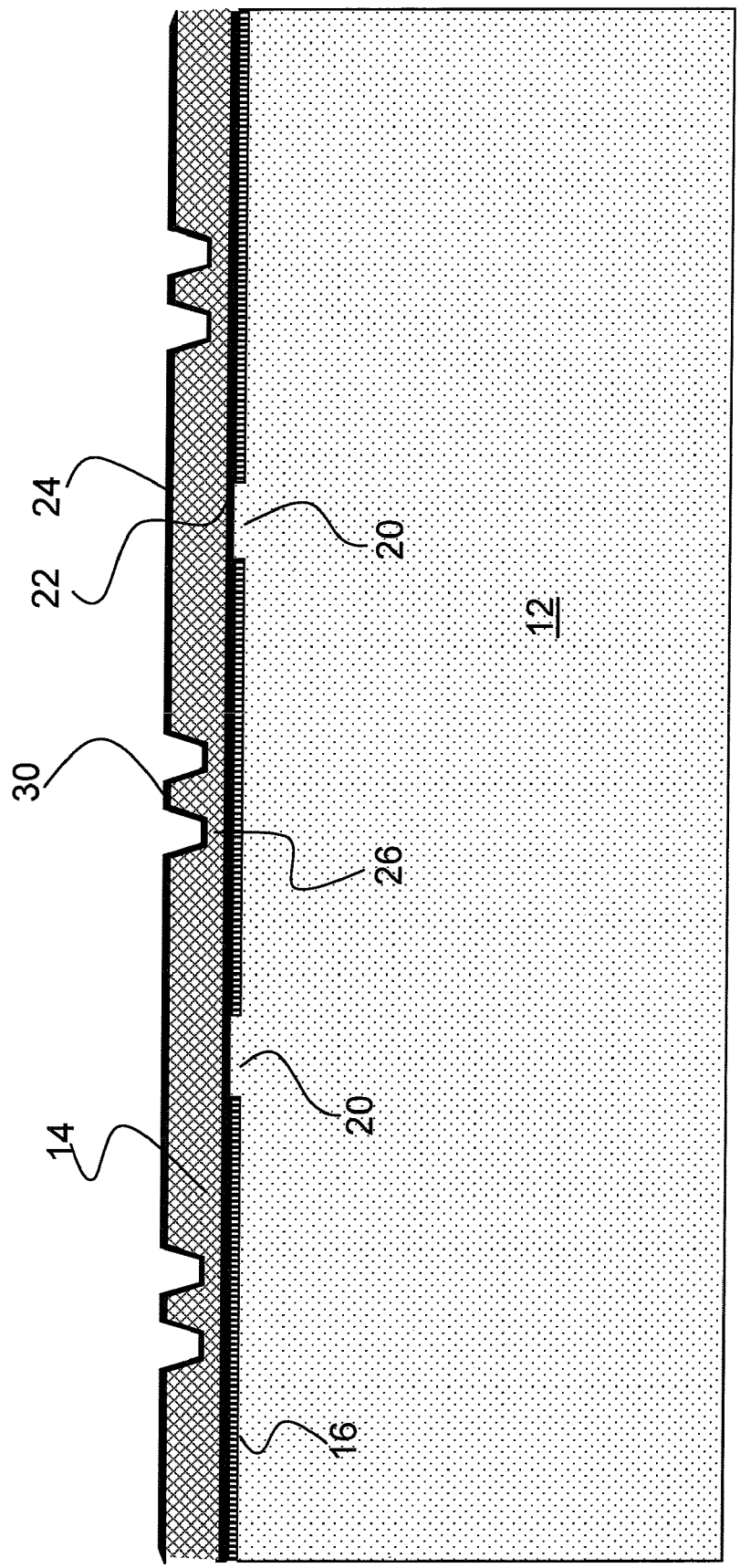
FIG. 8 illustrates a further step to the method from FIG. 7, in which a cladding coating of $SiO_2$ is deposited over the etched MgO doped LN wafer.

In FIG. 6, the MgO-doped lithium niobate material 14 is thinned, preferably by optical lap grinding and polishing, but could be thinned by etching such as Reactive-Ion-Etching (RIE). After thinning, trenches 28 are formed into the thinned lithium niobate layer 14, as shown in FIG. 7. For exampled trenches may be formed via Reactive Ion Etching (RIE) or with laser milling. The layer of lithium niobate remaining underneath these etched trenches 28 is called the planar slab region 26. The thinned and etched lithium niobate layer 14 can have a coating 24 applied, as shown in FIG. 8. The top coating 24 is optional. It protects the surface of the thinned lithium niobate layer 14 from contamination. The top coating 24 acts as a cladding, as well as, reducing the effect of contaminants on the operational characteristics of the device 10. The coating 24 may also include some conductivity, to dissipate pyroelectric generated charge.

Reactive Ion Etching in an inductively coupled plasma (ICP-RIE) is a preferred method for etching trenches 28. It comprises a method to chemically impose a topographical change in the surface of the waveguide layer 14. When the topography consists of trenches narrowly spaced, the waveguide 30 is formed by removing material on both sides of a narrow ridge. When the ridge is formed to the requisite width and height above the lower cladding layer 22, the ridge becomes a waveguide 30. ICP-RIE is not a mechanical working process.

Figure 9:
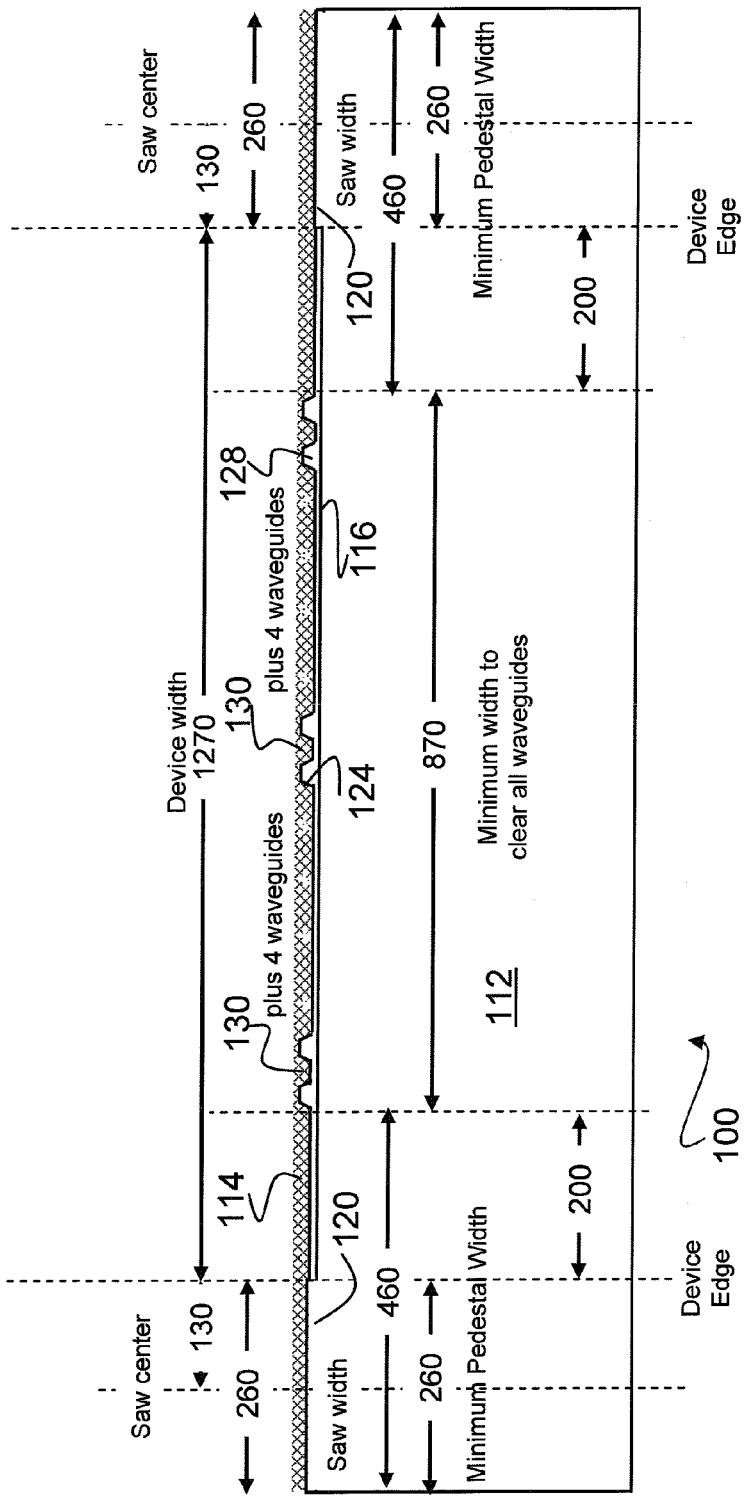
FIG. 9 is a cross-section of another embodiment of the ridge waveguide device in accordance with the present invention, in which the ridge waveguides are formed on the joining surface of the transmissive wafer with pedestals in the carrier wafer aligned on the dicing streets, prior to dicing from the assembled wafer structure.
Figure 10:
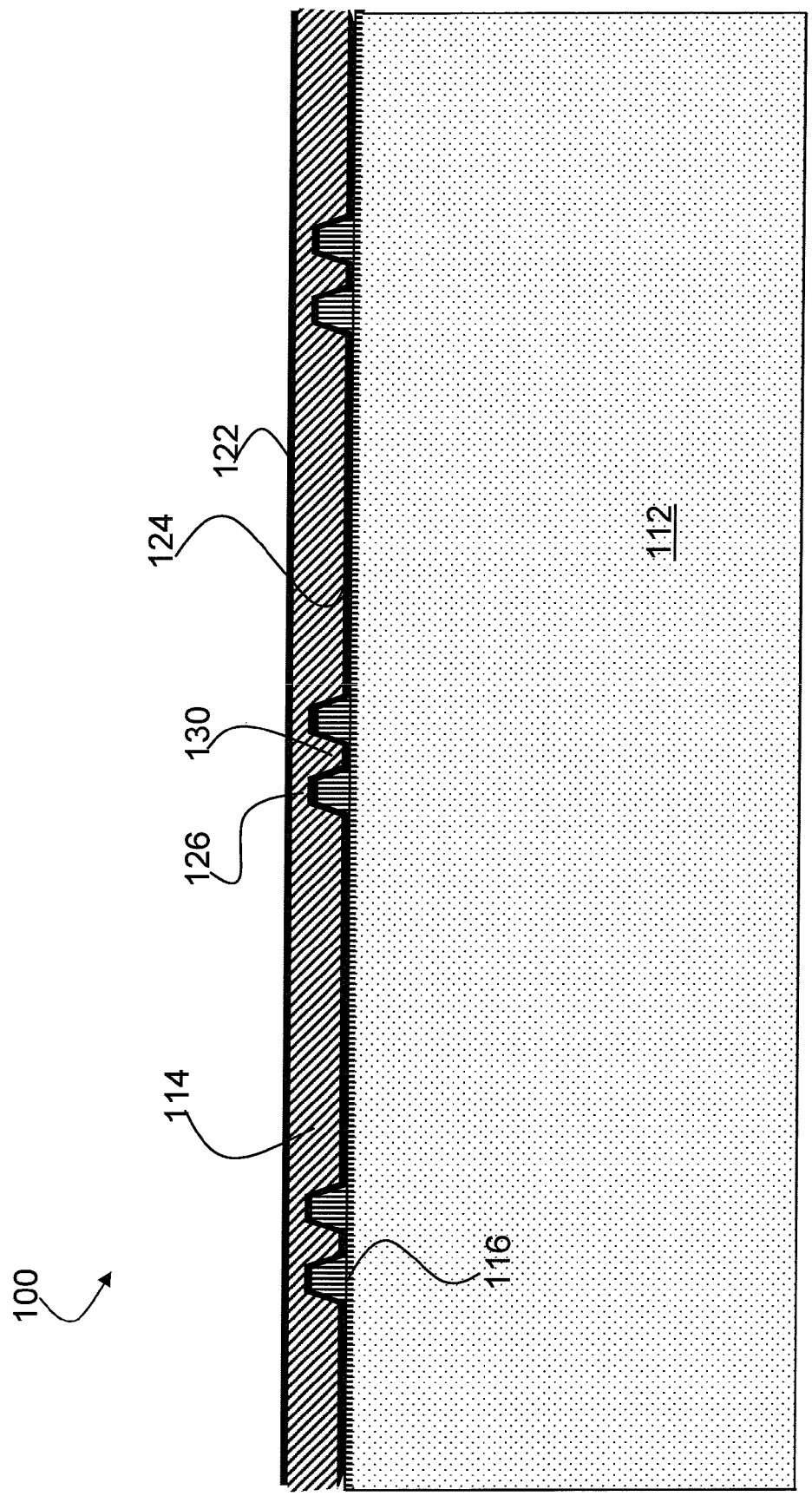
FIG. 10 is cross-section of a portion of the waveguide device of FIG. 9.
Figure 11:
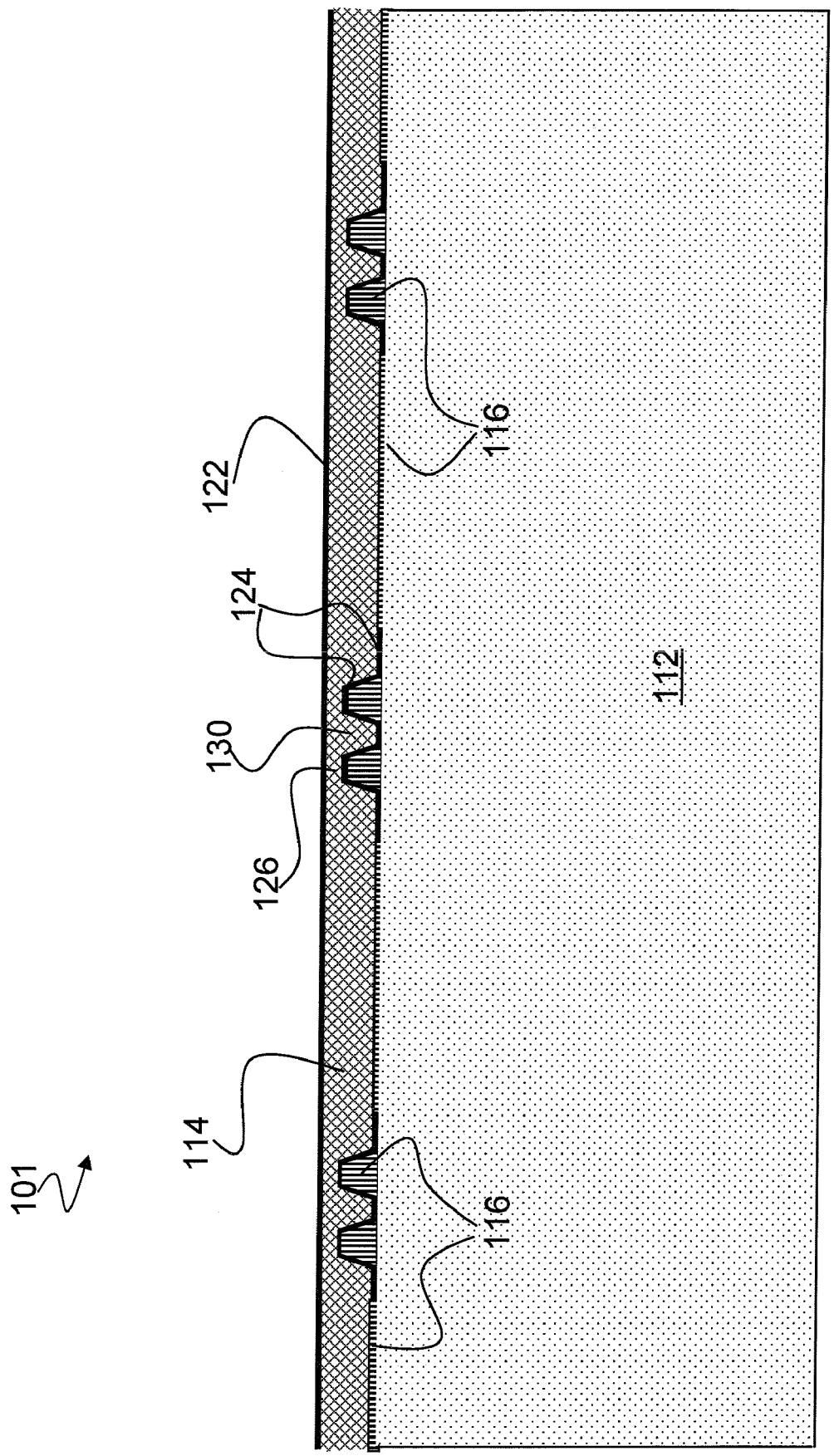
FIG. 11 is a further embodiment of the waveguide device of the present invention, in which pedestals of $SiO_2$ on the joining surface of the transmissive wafer surround each ridge waveguide of the device.

FIGS. 9-11 show preferred embodiments of the frequency doubling device 100, where the ridge waveguides 130 are upside down. The planar slab region 126 is above the ridge 130, instead of underneath it. The carrier wafer 112 is still beneath the ridge 130, as it was in FIGS. 1-8. In FIGS. 9 and 10, the adhesive layer 116 is continuous underneath all the ridges 130. As in FIG. 1, the carrier wafer 112 is etched to create wide trenches 118 separated by pedestals 120. As shown in FIG. 9, these are centered on the dicing streets. Thus the pedestals 120 do not show in the diced chip shown in FIG. 10. FIG. 11 shows a second version of the upside down ridge, where the adhesive layer is not continuous across the width of the device. For this embodiment, the $SiO_2$ cladding layer 124 is etched beyond the waveguiding area, including the ridge 130 and the slab region 126 above the trenches 128, to form a relief pattern comprising the pedestals 120 needed to control the adhesive thickness. Additional efficiency is realized in forming the pedestals 120 from the cladding layer 124.

Figure 12:
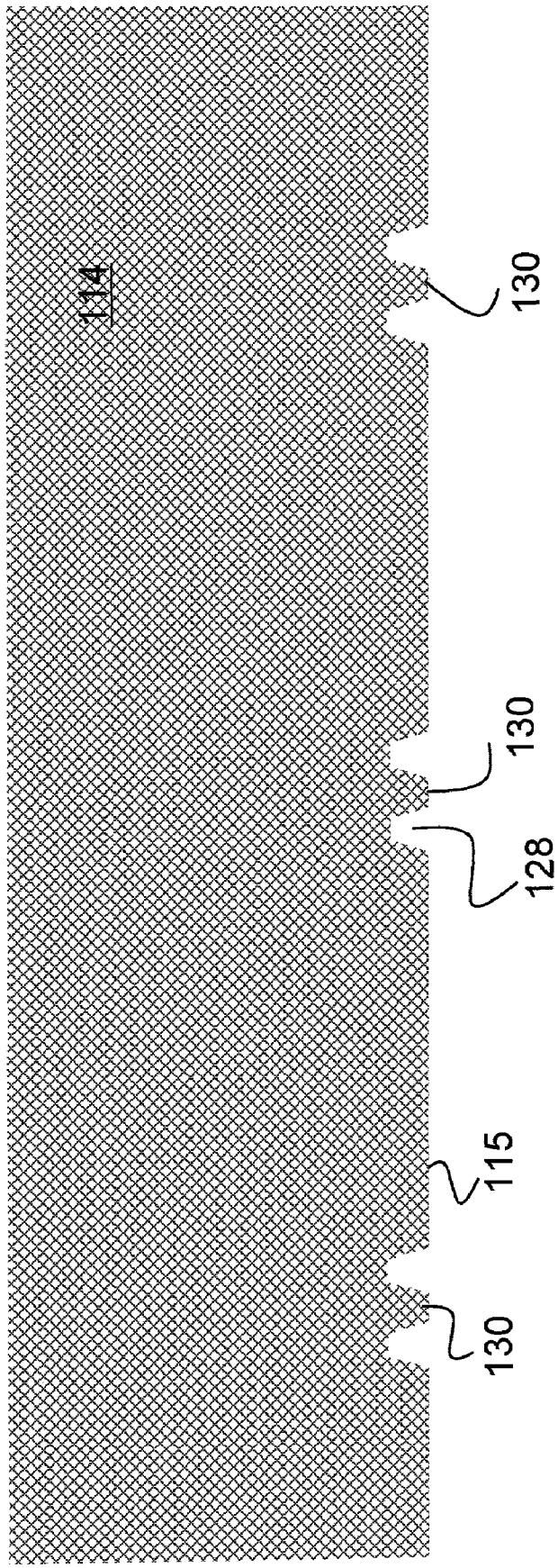
FIG. 12 illustrates a first step in a alternative method in accordance with the present invention in which trenches are etched in the joining surface of a MgO doped LN transmissive wafer to form ridge waveguides.
Figure 13:
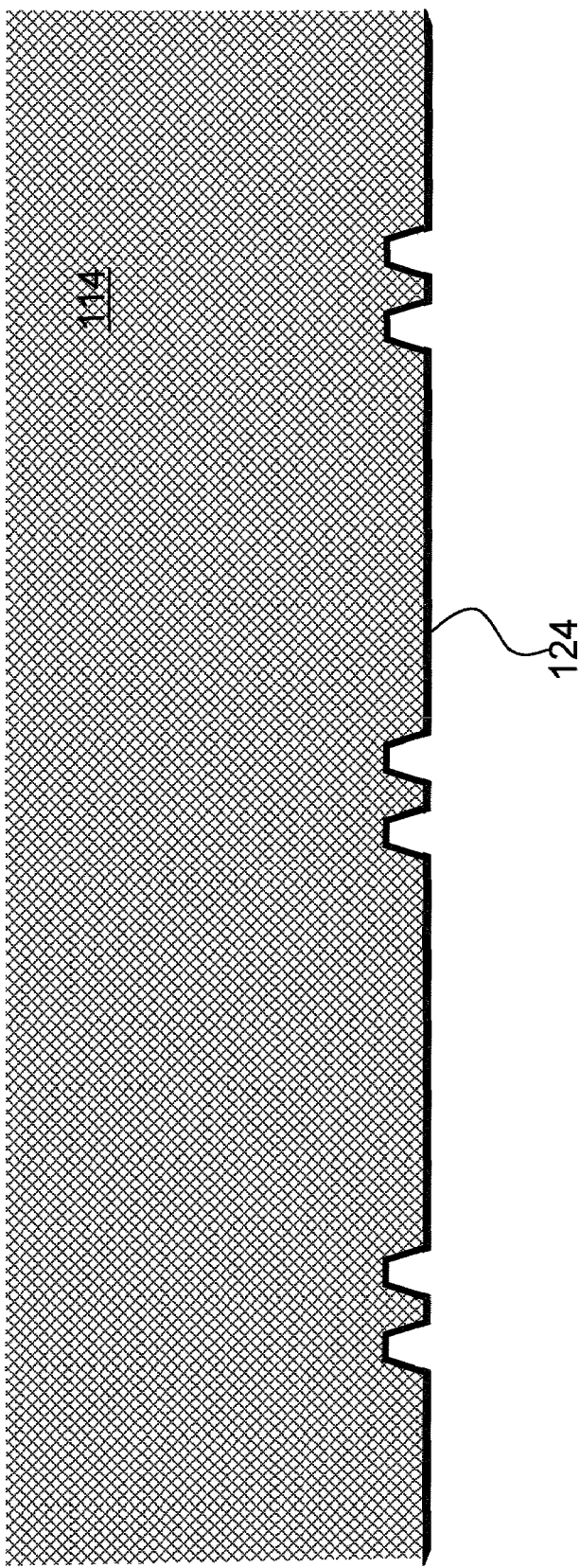
FIG. 13 illustrates a further step to the method from FIG. 12, in which an $SiO_2$ cladding layer is deposited over the joining surface of the transmissive wafer.
Figure 14:
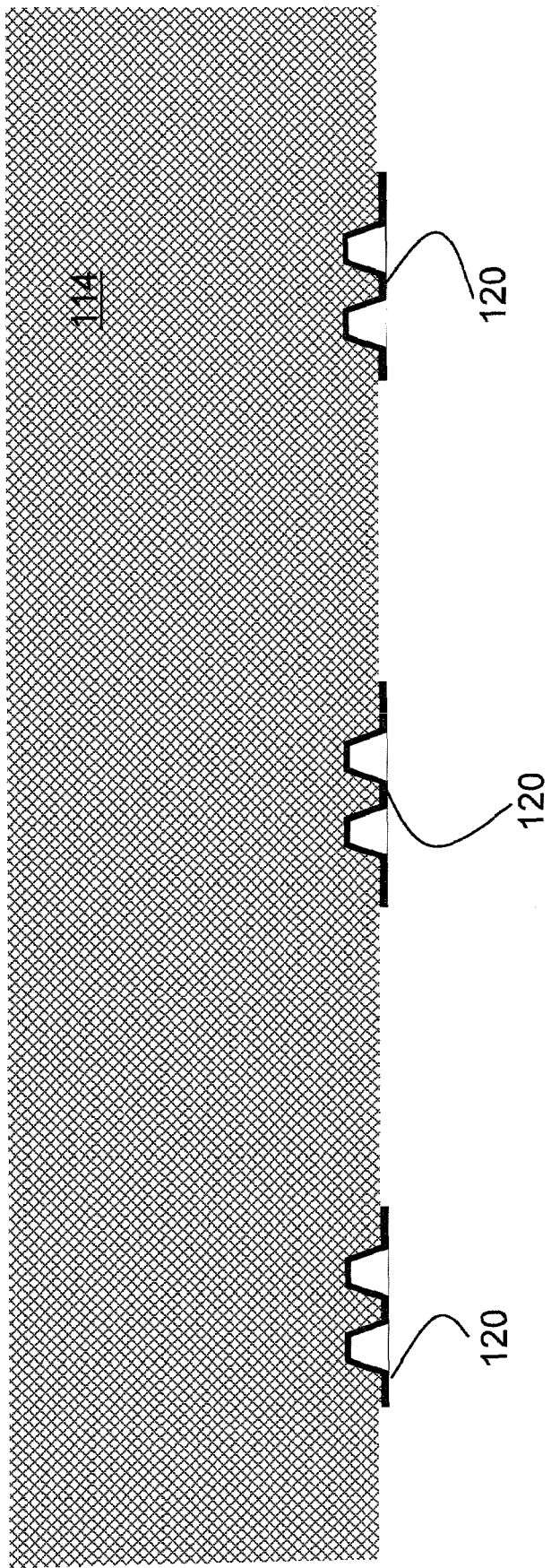
FIG. 14 illustrates a further step to the method from FIG. 13, in which the $SiO_2$ cladding layer is etched back without removing the cladding from the ridge waveguide areas.

FIGS. 12-18 describe the fabrication process for this second version of the upside down ridge 100. In FIG. 12, trenches 128 are etched into surface of an MgO-doped LN wafer 114. In this case in the joining surface 115. The orientation of the wafer 114 shows the trenches 128 to be on the bottom, simply to be consistent with the following figures. In FIG. 13, an $SiO_2$ coating 124 is applied over the trenches 128 and ridges 130. In FIG. 14, the $SiO_2$ coating is removed in certain regions, forming pedestals 120 needed for controlling the adhesive thickness.

Figure 15:
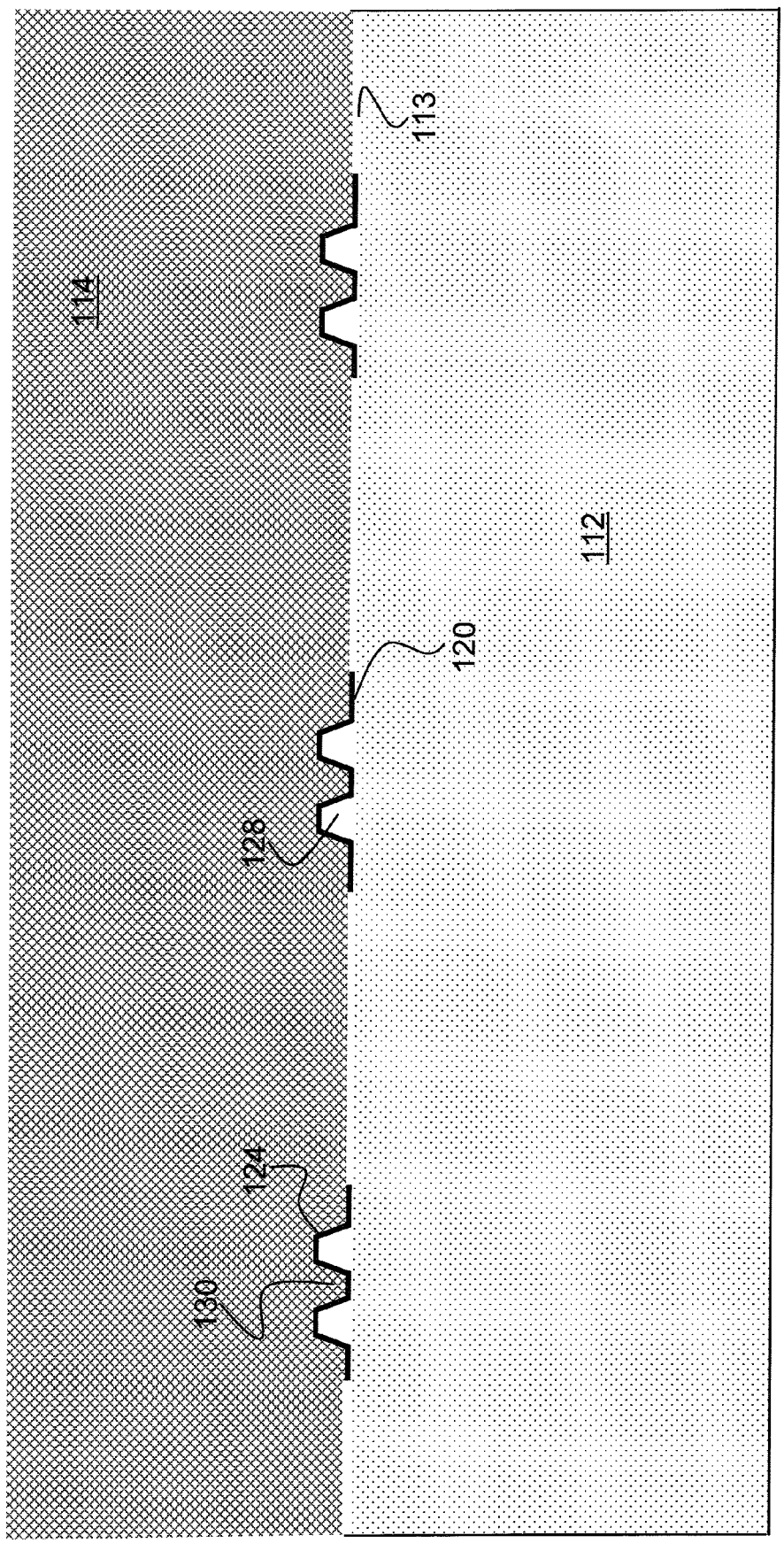
FIG. 15 illustrates a further step to the method from FIG. 14, in which the joining surface of the transmissive wafer is joined to a joining surface of the carrier wafer showing the interstices formed by the pedestals of remaining $SiO_2$ cladding.
Figure 16:
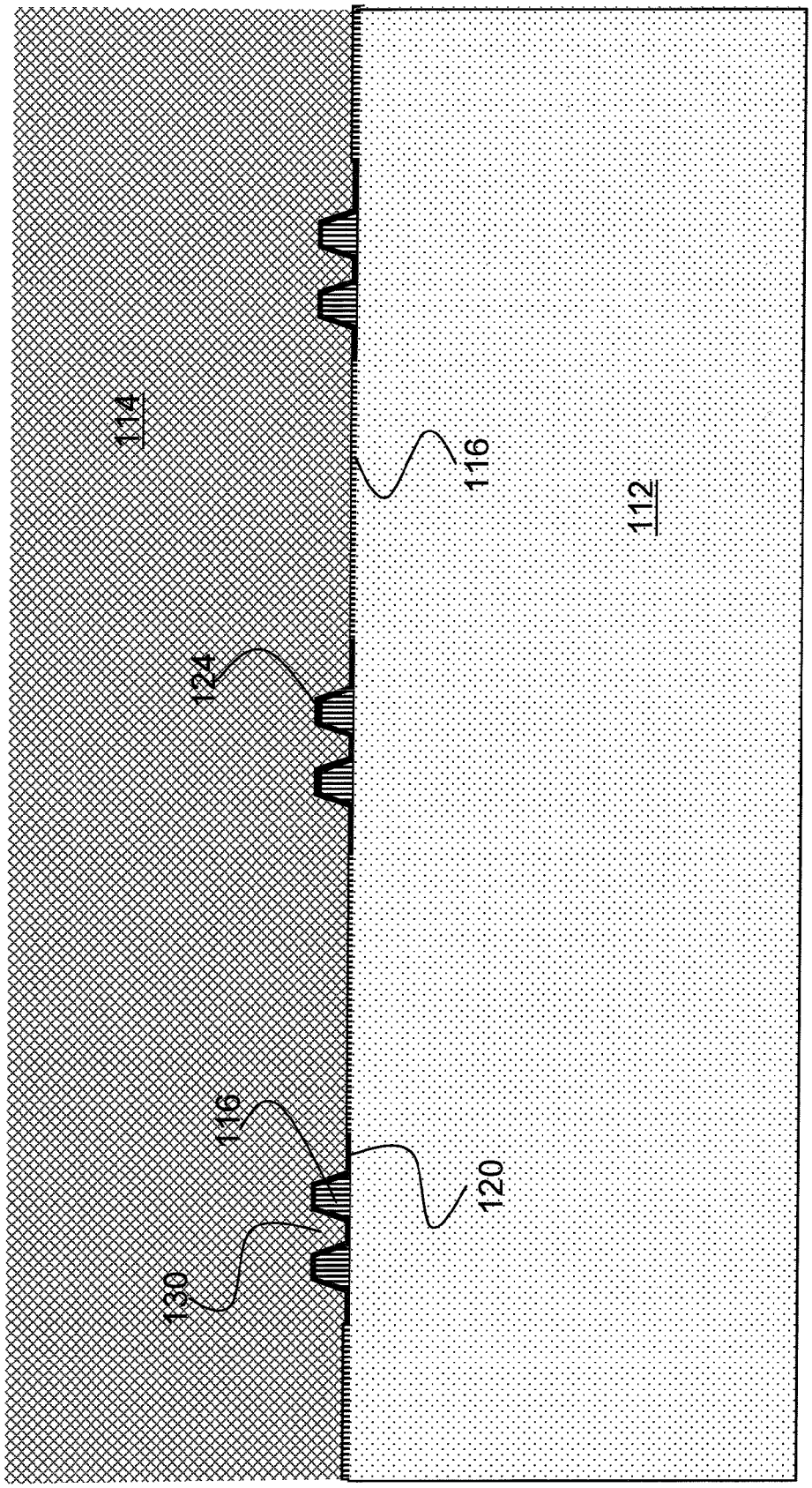
FIG. 16 illustrates a further step to the method from FIG. 15, in which adhesive is introduced into the interstices by wicking.
Figure 17:
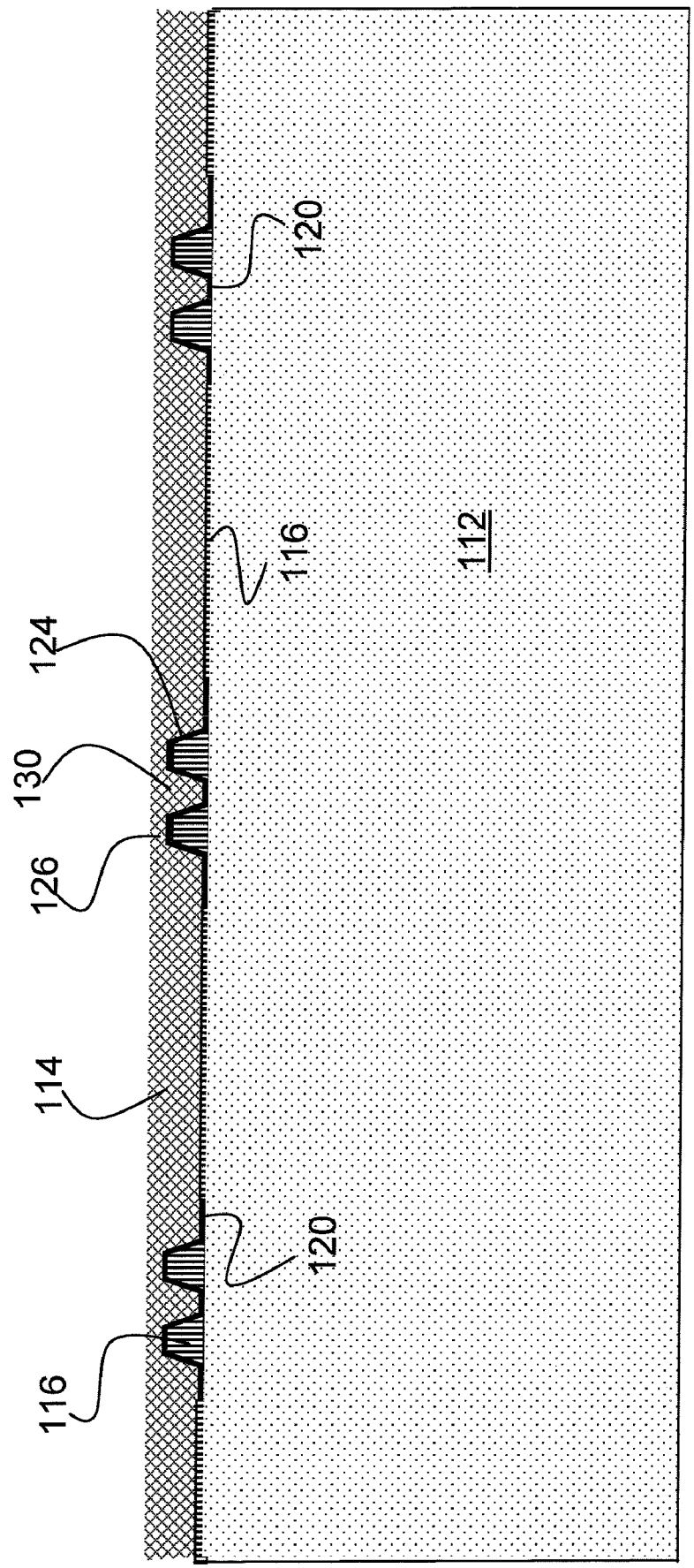
FIG. 17 illustrates a further step to the method from FIG. 16, in which the MgO doped LN transmissive wafer is thinned on its exterior surface.
Figure 18:
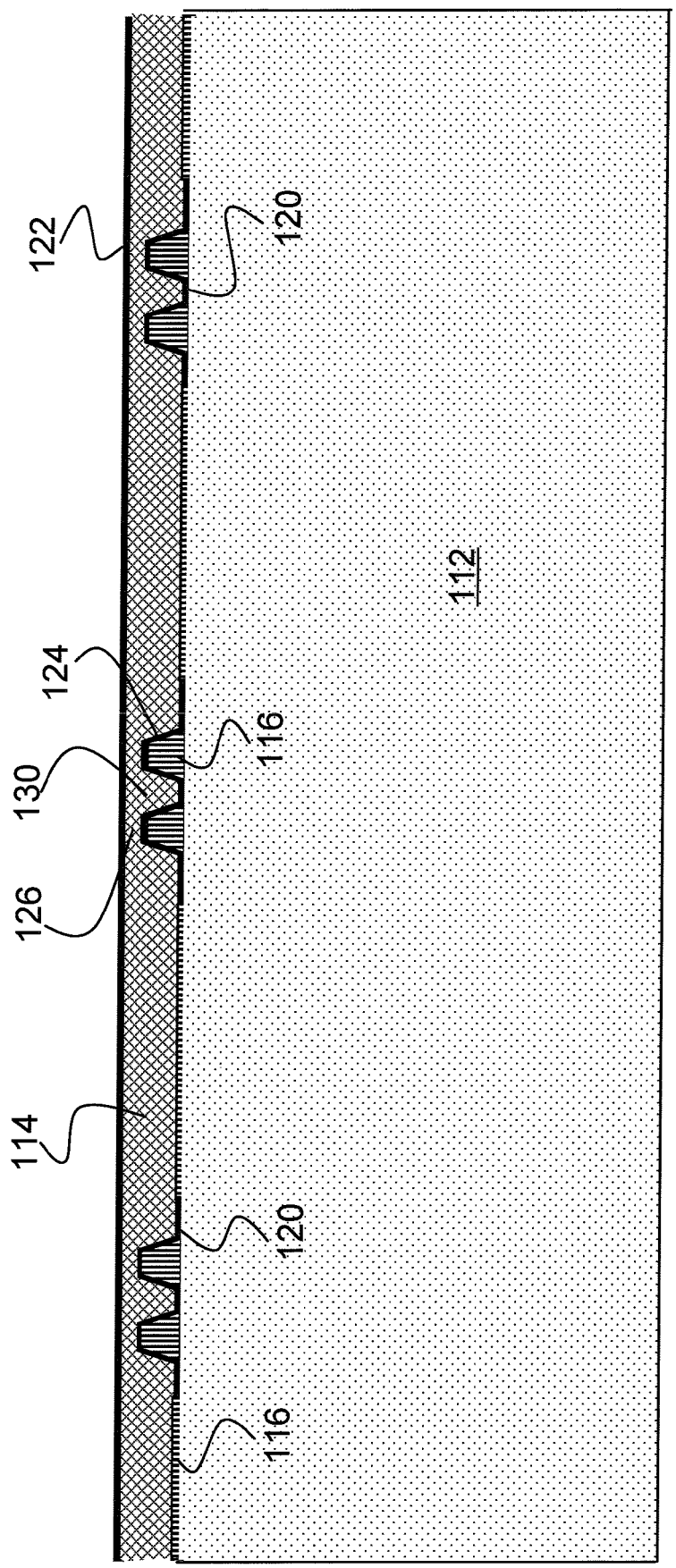
FIG. 18 illustrates a further step to the method from FIG. 17, in which a cladding layer of $SiO_2$ is deposited on the exterior surface of the transmissive wafer.

In FIG. 15, the MgO-doped lithium niobate wafer 114 is contacted with a carrier wafer 112, preferably a congruent lithium niobate wafer. In FIG. 16, adhesive 116 is introduced into the gap created by the patterned $SiO_2$ coating pedestals 120 and the trenches 128 that form the ridges 130. In FIG. 17, the MgO-doped lithium niobate material 114 is thinned by polishing or etching. An optional top coating 122 of $SiO_2$ is applied in FIG. 18. As before, the top coating 122 acts as a cladding, protects the surface of the thinned LN layer from contamination, and may also include some conductivity, to dissipate pyroelectric generated charge.

Tolerances in the method of the present invention to achieve wafer scale yield across a 4" wafer must result in finished devices having a thickness variation in the waveguide layer of within 0.5 microns, and preferably within 0.1 microns. To obtain this, the carrier wafer must have a surface parallelism equal to the finished tolerance of 0.5 microns or better, and a deposited pedestal height must have a uniformity within 0.05 microns and preferably within 0.01 microns.

In this preferred embodiment, waveguide reliability and fabrication yield are improved by means of a substrate that is electrically conducting. Previous descriptions of the waveguide device use ferroelectric material for the waveguide (such as lithium niobate) and essentially the same material for the substrate, in order to optimally match the CTE of waveguide forming layer and substrate. CTE matching minimizes or eliminates thermally induced strain in the waveguide, thereby improving its wavelength stability and long term reliability.

Figure 19:
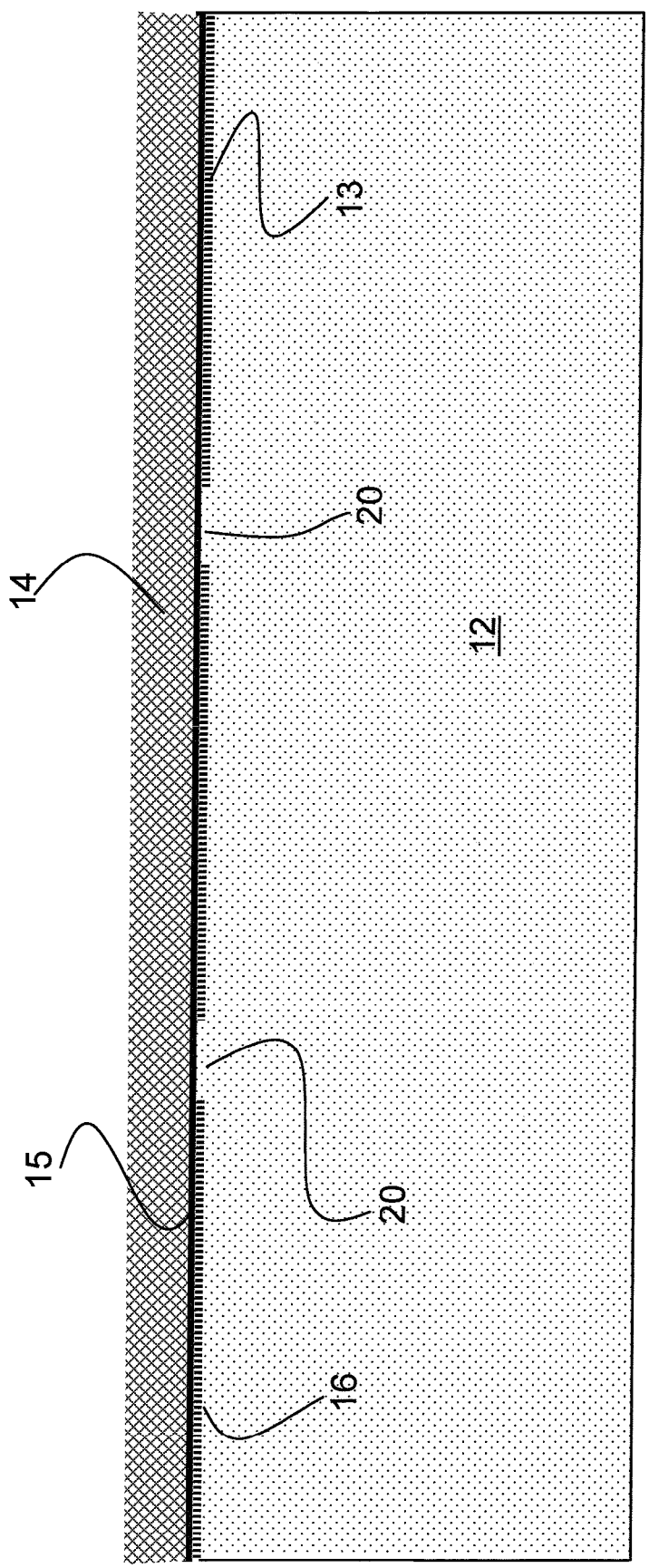
FIG. 19 is a cross-section of an assembled wafer structure including a carrier wafer and a transmissive wafer with pedestals surrounded by adhesive between them.

Once the completed wafer assembly is diced, endfaces of the individual ridge waveguide devices are polished to laser quality level. Anti-reflective coatings for the input and output wavelengths may be applied as required to enhance coupling efficiency The wafer scale process, illustrated generally by the wafer assembly shown in FIG. 19, is a method of adhesively securing a wafer of optically transmissive material 14 to a carrier wafer 12 having a parallelism within 0.5 microns, more preferably within 0.1 microns and accurately transferring that surface information to the joining surface 15 of the transmissive wafer 14. Thus a very thin optical waveguiding layer can be created with a thickness variation of within 0.1 micron.

This is accomplished by creating a relief pattern by etching into the joining surface 13 of the carrier wafer 12 to create a space 18 into which to introduce adhesive while placing the transmissive wafer 14 in direct contact with the reference surface 13 of the carrier wafer 12. Alternatively, the relief pattern is created by depositing a uniform layer over the joining surface 13, 15 of the carrier wafer 12 or the transmissive wafer 14 through a shadow mask or photolithographic mask; or by depositing a uniform layer over a patterned photo resist and subsequent lift-off. The pedestals 20 left standing in the relief pattern have a uniform height, within 0.1 microns, which transfer the surface information from the carrier wafer 12 to the joining surface 15 of the transmissive wafer 14.

This method can be used in wafer scale production of planar lightwave circuits (PLC) with highly uniform dimensions. Alternatively, this method can be used in wafer scale manufacture of electro-optic waveguide devices with very thin indiffused waveguides to reduce voltage requirements.

The embodiments of the invention described above are intended to be exemplary only. The scope of the invention is therefore intended to be limited solely by the scope of the appended claims.

We claim:

1. A wafer scale process for manufacturing optical ridge waveguide devices comprising the steps of:
   providing a transmissive wafer of optically transmissive material having a joining surface and an exterior surface;
   providing a carrier wafer having a joining surface and an exterior surface substantially parallel to the joining surface;
   creating one or more periodically poled regions on the joining surface of the transmissive wafer;
   creating one or more ridge waveguide structures aligned with the periodically poled regions on the joining surface of the transmissive wafer;
   applying a cladding layer having a uniform thickness on the joining surface of the transmissive wafer including the waveguide structures; and
   etching the cladding layer to create a relief pattern, the relief pattern comprising pedestals having uniform height equal to the thickness of the cladding layer without removing cladding from the waveguide structure;
   contacting the pedestals with the joining surface of the carrier wafer and introducing adhesive material into the spaces created by the relief pattern;
   polishing and thinning the transmissive wafer to a prescribed dimension; and
   dicing the assembled wafer structure into individual waveguide devices.

2. The wafer scale process in accordance with claim 1, wherein dicing streets are defined between the waveguide devices on the assembled wafer structure, and wherein at least one pedestal forming the relief pattern is disposed between dicing streets and remains in the finished waveguide device when diced.

3. The wafer scale process in accordance with claim 1, wherein the joining surface and the exterior surface of the carrier wafer are substantially parallel within 0.5 microns across the wafer.

4. The wafer scale process in accordance with claim 3, wherein the joining surface and the exterior surface of the carrier wafer are substantially parallel within 0.1 microns across the wafer.

5. The wafer scale process in accordance with claim 4, wherein the pedestals have a substantially uniform height within 0.01 microns across the wafer.

6. The wafer scale process in accordance with claim 3, wherein the pedestals have a substantially uniform height within 0.05 microns across the wafer.

7. The wafer scale process in accordance with claim 6, wherein the polished transmissive wafer has a thickness deviation of less than 0.1 micron across the wafer.

8. The wafer scale process in accordance with claim 1 further including the step of polishing input and output end faces of the diced individual waveguide devices.

9. The wafer scale process in accordance with claim 1, wherein the relief pattern is adapted to wick adhesive between the joining surfaces of the transmissive wafer and the carrier wafer.

10. The wafer scale process in accordance with claim 1, wherein the step of thinning the transmissive wafer comprises thinning by reactive ion etching in an inductively coupled plasma.

11. The wafer scale process in accordance with claim 1, wherein dicing streets are defined between the waveguide devices on the assembled wafer structure, and wherein the pedestals forming the relief pattern are aligned with the dicing streets, the pedestals having a width such that a portion of the pedestal remains in the finished waveguide device when diced.

12. The wafer scale process in accordance with claim 1, wherein the optical ridge waveguide devices have a thickness deviation of less than 100 nm per 100 mm per wafer.

13. The wafer scale process in accordance with claim 1, further comprising the step of:
   applying a cladding layer to the polished and thinned exterior surface of the transmissive wafer, prior to dicing the assembled wafer structure.

14. The wafer scale process in accordance with claim 1, wherein dicing streets are defined between the waveguide devices on the assembled wafer structure, and wherein the pedestals forming the relief pattern are aligned with the dicing streets, such that the pedestals are removed from the finished waveguide devices when diced.

15. A method of manufacturing optical waveguide devices comprising the steps of:
   providing a transmissive wafer of optically non-linear transmissive material having a joining surface and an exterior surface;
   providing a carrier wafer having a joining surface and an exterior surface;
   creating a ridge waveguide structure in the joining surface of the optically transmissive wafer;
   applying a cladding layer to the joining surface of the optically transmissive wafer including the waveguide structure;
   etching a portion of the cladding layer to the joining surface, without removing the cladding on the waveguide structure, to create a relief pattern adapted to facilitate an adhesive joint between the joining surfaces;
   contacting the cladding layer to the joining surface of the carrier wafer, and introducing adhesive into the spaces created by the relief pattern;
   polishing and thinning the exterior surface of the transmissive wafer; and
   dicing the assembled wafer structure into individual waveguide devices.

16. The method of manufacturing optical waveguide devices as defined in claim 15, further including the step of forming periodically poled portions on the joining surface of the transmissive wafer at least at locations coinciding with the ridge waveguide structure.

17. The method of manufacturing optical waveguide devices as defined in claim 16, wherein the ridge waveguide structure comprises a plurality of ridge waveguide structures within each optical waveguide device, each ridge waveguide structure having a different conversion wavelength.

18. The method of manufacturing optical waveguide devices as defined in claim 17, wherein the plurality of ridge waveguide structures have different conversion wavelengths due to dimensional variation resulting from process variation.

19. The method of manufacturing optical waveguide devices as defined in claim 17, wherein the plurality of ridge waveguide structures have different conversion wavelengths obtained by varying the lateral dimension of the ridge waveguide structures.

20. The method of manufacturing optical waveguide devices as defined in claim 17, wherein the plurality of ridge waveguide structures have different conversion wavelengths obtained by varying in the period of the periodically poled portions.

21. An optical waveguide device comprising:
a carrier substrate having a joining surface substantially parallel to an exterior surface;
an optically transmissive substrate having a joining surface with a ridge waveguide formed therein;
a cladding layer formed over the ridge wave guide and forming a discontinuous layer on the joining surface of the transmissive substrate comprising a relief pattern of uniform height; and
adhesive material disposed in the spaces created by the relief pattern securing the joining surface of the carrier substrate to the joining surface of the trasmissive substrate, such that the adhesive has a constant thickness between the joining surfaces established by the relief pattern of the cladding layer.

22. The optical waveguide device as defined in claim 21, wherein the waveguide comprises a ridge waveguide having periodic poling of the crystal structure.

23. The optical waveguide device as defined in claim 22 wherein the optical waveguide device includes a plurality of ridge waveguides formed on the transmissive substrate, each of the plurality of ridge waveguides having a different conversion wavelength.

24. The optical waveguide device as defined in claim 23, wherein the plurality of ridge waveguides differ in dimension due to process variation resulting in different conversion wavelengths.

25. The optical waveguide device as defined in claim 23, wherein the plurality of ridge waveguides have different lateral dimensions to produce different conversion wavelengths.

26. The optical waveguide device as defined in claim 23, wherein the plurality of ridge waveguides have different periods of the periodically poled portions to produce different conversion wavelengths.

27. The optical waveguide device as defined in claim 22, wherein a coefficient of thermal expansion of the carrier substrate substantially matches a coefficient of thermal expansion of the transmissive substrate.

28. The optical waveguide device as defined in claim 27, wherein the carrier substrate is conductive lithium niobate.

29. The optical waveguide device as defined in claim 27, wherein the carrier substrate is lithium niobate and the transmissive substrate is magnesium doped lithium niobate.

30. The optical waveguide device as defined in claim 29, further including a cladding layer on an exterior surface of the transmissive substrate.

31. The optical waveguide device as defined in claim 30, wherein the cladding layer on the exterior surface of the transmissive substrate is conductive in order to dissipate pyroelectric generated charges.

* * * * *